(12) United States Patent
Rittner et al.

(10) Patent No.: US 9,296,333 B2
(45) Date of Patent: Mar. 29, 2016

(54) LIGHTING DEVICE OF AN AIRCRAFT, SYSTEM, PASSENGER SERVICE UNIT, METHOD OF OPERATING A LIGHTING DEVICE

(71) Applicant: INTERTECHNIQUE, Plaisir (FR)

(72) Inventors: Wolfgang Rittner, Ahrensbok (DE); Mark Niedostatek, Wenzendorf (DE); Rüdiger Meckes, Berkenthin (DE); Günter Boomgarden, Scharbeutz (DE)

(73) Assignee: Zodiac Aerotechnics, Plaisir (FR)

( * ) Notice: Subject to any disclaimer, the term of this patent is extended or adjusted under 35 U.S.C. 154(b) by 345 days.

(21) Appl. No.: 13/893,625

(22) Filed: May 14, 2013

(65) Prior Publication Data

US 2014/0340916 A1 Nov. 20, 2014

(51) Int. Cl.
*B64D 47/02* (2006.01)
*B60Q 3/02* (2006.01)
*G06F 3/00* (2006.01)
*B64D 11/00* (2006.01)

(52) U.S. Cl.
CPC ............ *B60Q 3/0286* (2013.01); *B60Q 3/0296* (2013.01); *B64D 11/00* (2013.01); *B64D 11/0015* (2013.01); *G06F 3/00* (2013.01); *B64D 2011/0053* (2013.01)

(58) Field of Classification Search
CPC .......... B64D 2011/0038; B64D 11/00; B64D 2011/0053; B64D 11/0015; B64D 11/06
USPC .................................................. 362/470, 471
See application file for complete search history.

(56) References Cited

U.S. PATENT DOCUMENTS

| | | | |
|---|---|---|---|
| 9,092,136 B1* | 7/2015 | Patel et al. | |
| 2003/0165048 A1* | 9/2003 | Bamji et al. | 361/681 |
| 2008/0024463 A1* | 1/2008 | Pryor | 345/175 |
| 2010/0205333 A1* | 8/2010 | Francois et al. | 710/62 |
| 2012/0292960 A1* | 11/2012 | Guering | 297/216.12 |

FOREIGN PATENT DOCUMENTS

| | | |
|---|---|---|
| EP | 2546102 A1 | 1/2013 |
| WO | 2011082998 | 7/2011 |

OTHER PUBLICATIONS

Europe Patent Application No. 13167665.2, Extended Search Report dated Dec. 4, 2013.

* cited by examiner

*Primary Examiner* — William Carter
(74) *Attorney, Agent, or Firm* — Kilpatrick Townsend & Stockton LLP; Dean W. Russell, Esq.; Renae Bailey Wainwright, Esq.

(57) ABSTRACT

Described are lighting devices of passenger aircraft. Also described are methods of operating the devices as well as lighting systems and passenger service units.

13 Claims, 6 Drawing Sheets

LIGHTING DEVICE OF AN AIRCRAFT, SYSTEM, PASSENGER SERVICE UNIT, METHOD OF OPERATING A LIGHTING DEVICE

FIELD OF THE INVENTION

This invention relates to a lighting device for at least one passenger of an aircraft according to the preamble part of claim 1. The invention also relates to a system and a passenger service unit. Furthermore this invention relates to a method of operating a lighting device according to the preamble part of claim 12. Further the invention relates to a means for providing a light projection forming a continuous adaptable light projection.

BACKGROUND OF THE INVENTION

Lighting devices which are configured for passengers of an aircraft are known as reading light in supply unit of a passenger service unit. This aforementioned supply unit is configured for a passenger's journey and integrates comfort, control and safety elements for at least one passenger. Thus, almost all supply units comprise reading lights, an attended call light, information signs, a steward call button, a loudspeaker, ventilation nozzles and further features for increasing the service of an aircraft. The interior of a passenger supply module depends on the fitting of the dimension of the cabin of the passenger service unit. For handling the conventional supply unit usually a mechanical adjustment is provided for the reading light and buttons or switches are manually operable in the upper region of a passenger service unit. In some aircrafts a remote control for the supply unit is integrated nearby the passenger seats and usually also combines operating of entertainment devices.

WO 2011/082998 discloses an arrangement of a supply module wherein different seat positions may be illuminated in a passenger aircraft without mechanical positioning or manual adjustment of a supply unit. The supply module is being arranged to offer illumination and different services or functions like visual information, acoustic information, air control surfaces or medical oxygen. The activation of the supply module is effected by a control unit wherein the operating bases on a pre-definable seating configuration. The service also includes a combination of the display and interactive surfaces by specific appropriate techniques for having interactive subregions with a function in the manner of a touch screen or touch panel; the latter can be located on system defined certain places or selected surfaces.

SUMMARY OF THE INVENTION

It is a major object of the present invention to provide a lighting device and related apparatus and a method for at least on passenger which is adapted for an improved functionality of a light projection. It is still a further object of this invention to get an operator surface continuously adapted for generating touch signals which can be adjusted more easily by a passenger, in particular in a more convenient way. It is still another object of the invention to provide a method of operating a lighting device.

In relation to the lighting device the object of this invention is achieved by the lighting device as mentioned in the introduction. Thus, the invention relates to a lighting device for at least one passenger of an aircraft, comprising:

means for providing a light projection of an operator surface on a suitable body, wherein the operator surface is adapted for generating touch signals, and the operator surface is performed by
 a beam forming module for adjusting the light beam geometrical properties and
 a light forming module for adjusting the light optical properties.

In accordance with the invention in the lighting device the light projection is formed as a continuous adaptable light projection, wherein a first sensor unit provides size and position information of the suitable body for a continuous adaption of the operation surface on the body a second sensor unit detects generated touch signals corresponding to the position on the operation surface being touched, and wherein the generated information and touch signals are transmitted to an operator system for achieving an operating response.

Thus basically, this invention provides a lighting device which is capable to form a continuous light projection by continuously getting size and position information of a suitable- user defined body.

As relates the further apparatus the invention also leads to a system of claim 9 and a passenger service unit of claim 11.

As relates the method the object is achieved by the method as mentioned in the introduction. In accordance with the invention in the method also the steps of the characterizing part of claim 12 are provided.

The invention also leads to a software code means of claim 13.

The invention recognized that it is desirable to adjust a lighting device for getting a light projection of an operator surface which can be used independently of the situation or a seat position. Thus, this invention provides an inventive concept of light projection comprising a means for providing a light projection which is continuous adaptable on each suitable body. The concept of this invention in particular affords to provide a light projection independend on the size and/or position; furthermore the suitable body needs not to be fixed. A suitable body in general can be any available body of a passenger or a seat or other objects in the neighborhood or available to the passenger. Thus, basically without limitation, a suitable body can be defined as a body suitable to receive a light projection visible and operable by a passenger. E.g. the suitable body can be triggered or selected by the passenger. This means that it can be included in the passenger unit, nearby the passenger seat or can be part of the passengers body itself.

According to the invention a first sensor unit of the lighting device continuously provides size and position information of suitable body. E.g. on this suitable body a laser projection can be provided in form of an operating surface. In the case that the position or size of the suitable body changes, for example by moving a hand of a passengers body, the lighting device will be able to adjust the light projection to the new position. Therefore a flexibility of the light projection is considerably increased. A fixed position e.g. can be replaced by an automatically adaption and adjustment of the operator surface depending on the size and position of the suitable body which is more advantageous as compared to commonplace measure of fixed projection surfaces in the prior art. A lager variety of surfaces and positions can be offered to the passenger and therefore the comfort and the flexibility of handling of functional units is increased by means of the operator surface.

The invention recognized that is desirable to provide light projection in form of an operator surface which is continuous adaptable on the position on a suitable body for generating touch signals and receiving operating response. The invention advantageously provides an operator surface for generating touch signals and wherein this touch signals also includes operating response. The individual demands of the passenger with regard to the lighting device will be detected by a second sensor unit and can be transmitted to an operator system. Thereupon the operator system will generate the operating response to the passenger.

Further a beam forming element is provided for adjusting the light beam geometrical properties and a light forming element for adjusting the light optical properties so that the operation surface can be adjusted to practically any predetermined selected shape, pattern and size in each desirable position of the operator surface.

The invention recognized that the handling of such operator surface is significantly improved when the suitable body is not attached to certain plane. This invention offers the possibility to have a detached light projection for instance a light projection directly on the own passenger's hand which is very easy to handle and increase the comfort of the single passengers. The request to change into a seating position for handling the operator plane is not necessary anymore. The inventive concept provides for the passenger the possibility to stay in its own position just choosing the own hand for the operator surface.

These and the further developed configurations of the invention are further outlined in the dependent claims. Thereby, the mentioned advantages of the proposed concept are even more improved. For each feature of the dependent claims it is claimed independent protection independent from all other features of this disclosure.

In a particular preferred development it has been recognized to be a convenience when the operator surface is configured as an illumination pattern. In particular a self-explanatory illumination pattern can be provided as a touch panel, keyboard or key pad. The development at least recognized that is desirable that the lighting device has operating response for each situation of the passengers which means that the touch signal creates operating response which will be adapted of the operating system.

Providing a lighting device of a development has also the advantage to start a laser projection of the operator plane by an activation motion and/or a starter signal which increases the comfort of handling a operator plane. Preferably the development includes an activation motion and/ or start signal for starting the laser projection of an operator plane. Depending on the response of the operator system an operator surface appears by an activation motion and can be activated additionally by a start signal. This ensures a controllable activation of a laser projection in each situation of an aircraft. The concept of the lighting device can be adapted with improved flexibility according to the individual demands of a passenger which can determined the most suitable surface by itself.

A further development provides means for establishing an aforementioned laser projection wherein a first and a second sensor unit detect the incoming signals and an operator system will provide an operator response. The response can be individually provided by the demand of the passenger. The development offers a advantageously increased degree of freedom during the journey of one passenger.

In a particular preferred development the continuous adaptable light projection is initiated by an activation motion and/or a starter signal. This additional feature is a beneficiate for generating an operating surface in each passenger defined situation and each position par example with a wiped moving of a hand. This feature also excludes a generating of an operating surface in situation by the first sensor unit which is not desirable in this situation. Not before getting in activation motion for activation the operating plane will not appear. Additionally or instead of a activation motion the operation surface can be activated by a starter signal which might be a pausing on a certain point.

In a particular preferred development the operator surface comprises a continuous adaptable illumination pattern. The manual handling of the operating plane will be improved by a partition of such an operating plane for generating single touch signals. The visualization of a different touch pattern increased the exact assignment of the touch signal places for each passenger. In a particular preferred development the operation surface comprises alternatively or additional a virtual touch panel which increases auto didactic understanding of the passengers and increases the number of possible touched signals and thereby the number of operating responses. Also the design of the common used remote unit could be possible as a continuous adaptable laser projection. A passenger can interact with the laser projection and can interact with the operating response.

In a particular preferred development the continuous adaptable light projection is adapted as a projection of a holographic film. This projection comprises par example the virtual realization of a virtual button or switches which is a mostly convenient for the passenger for an operating signal because of the adaptation of the prior behavior. In this case this development is mostly innovative because the button or switches also the keyboards or remote control which will be virtually transferred next to the passengers wherever the passenger wants to place it. Buttons, switches and so are normally placed at the upper panel of the passenger service unit. The operating signal can be adapted without changing the seating position.

In a particular preferred development the suitable body is formed by a passenger's hand. In the known state of the art of an aircraft passengers normally have placed the remote control in one hand and interact with the surface of a remote control unit with the other hand. In this case there would be no remote control necessary as additional devices but it would be still comfortable and familiar for the passenger giving operating orders. The adapting of an illumination pattern on the hand independent of the size and position because of the detection of the first sensor unit would increase much more the comfort of each passenger. Also the activation can be promptly initiated without getting the device itself or finding the possible position of an operator surface even a button, switches and so on.

In a particular preferred development the continuous adaptable light projection includes the operating of service unit devices and/or the cabin attendant call. The continuous adaptable operating of an operator plane should also include service devices of the passer service units like reading light, ventilation nuzzles and further more the cabin attendant call. The necessity for such a laser projection is in particular obvious for the cabin attendant call because this feature should always be available in each situation and position of the passenger. This development provides with the laser projection the possibility for adapting an always reachable virtual cabin attendant call button.

In a particular preferred development a physical touch panel adjoins the virtual touch panel and is configured to generate a touch signal corresponding to the position being touched on the virtual touch panel. The developed concept of the lighting device is not restricted to a single laser projection directly control connected to a operator system. The operating surface can also adjoin a physical touch panel which is an interposer to the operating system. This offers a possible retrofitting of the passenger's cabin and increases the freedom of design.

In a particular preferred advantageous development the operator system of the continuous adaptable laser projection is remotely controllable by the external unit for providing central orders and interacting of a central position for par exampling landing and starting positions.

In a particular preferred development the operator system is adapted to communicate wireless with the external unit wherein a transmission technology between the operator system and the external unit is selected from the group of technologies consisting of Wifi, RFID, IR and Bluetooth technology. For this development the continuous adaptable laser projection offers a high flexibility and disintegrates the stationary passenger service unit. By providing a wireless communication to an external unit the disintegration and the higher flexibility within an aircraft is achieved.

In a particular preferred development a supply unit comprises a lighting device. As aforementioned the passenger unit includes a lot of features as reading light, attend call buttons which are located in the upper region of a passenger seat. The chosen location for the lighting device should enable a large range for providing the continuous laser projection. The cone of light will have an optimized area if the lighting device is located in the upper region of the passenger which means that the passenger service unit seems to be convenient for the lighting device.

In a particular preferred development software means storable in an operator system is connected to the lighting device wherein the software means is adapted to continuously adaptable light projection for getting necessary information, signal transmission and required operator responses which is required by the touch signal.

In a particular preferred development a method of operating a lighting device comprise the steps of providing a light projection of an operator surface on a suitable body, wherein the operator surface is adapted for generating touch signals. This method means the operator surface is performed by a beam forming element for adjusting the light beam geometrical properties and by a light forming element for adjusting the light optical properties. The inventive step of the method is the performing light projection which is continuous adaptable on a suitable body, wherein a first sensor unit provides size and position information of the suitable body for a continuous adaption of the operation surface on the body and wherein a second sensor unit detects generated touch signals corresponding to the position on the operation surface being touched, and wherein the generated touch signals are transmitted to an operator system for getting a operating response.

BRIEF DESCRIPTION OF THE DRAWINGS

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to an exact form and detail shown and described herein, nor to anything less than the whole of the invention disclosed herein and as claimed hereinafter. The drawing shows in.

DETAILED DESCRIPTION OF THE DRAWINGS

Figure 1A:
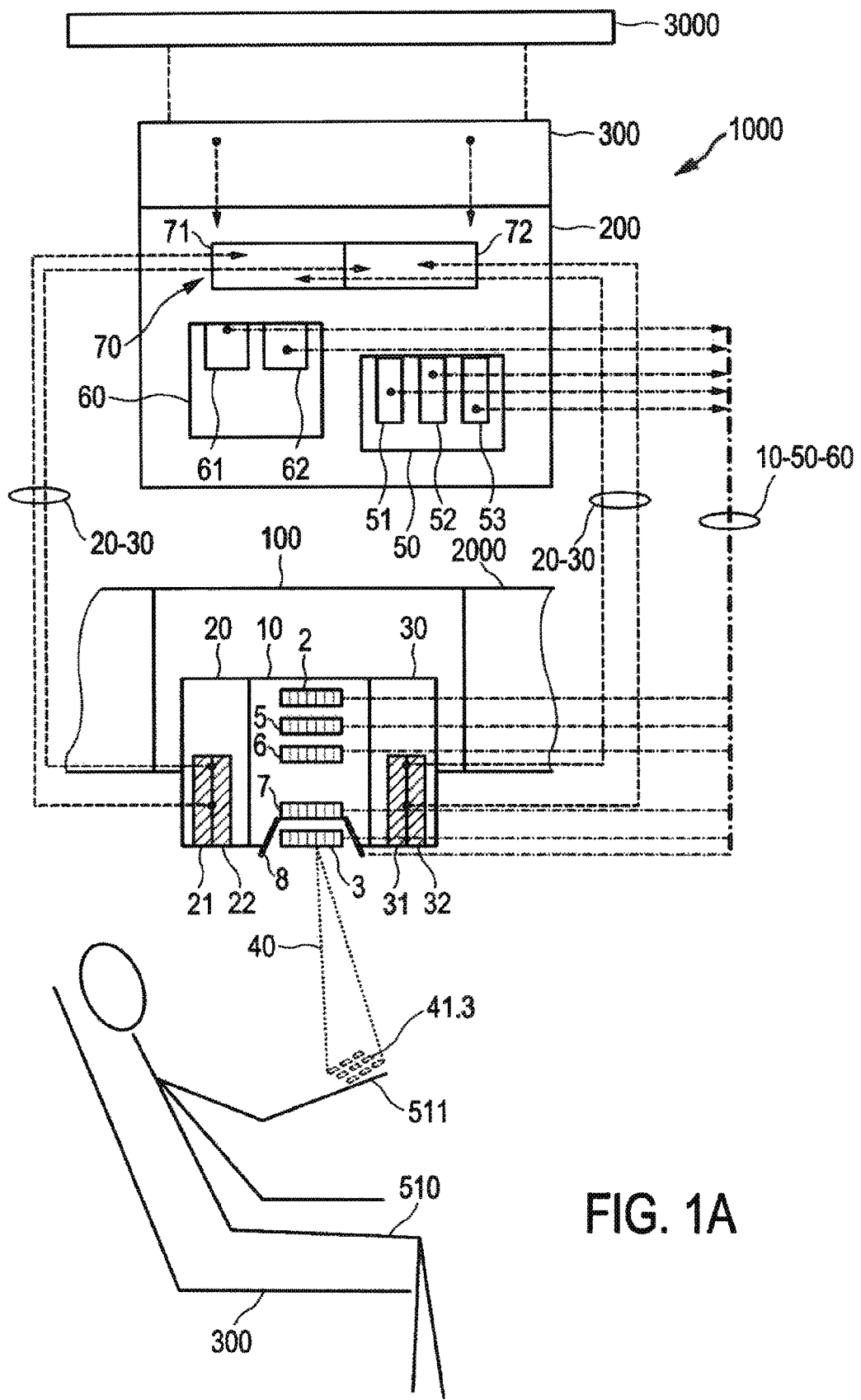
FIG. 1A: a first embodiment of a system of a lighting device for light projection for one passenger of an aircraft, the lighting device being arranged in an over-head panel above a single passenger seat, wherein the lighting device is integrated in the PSU individually assigned to a passenger.

FIG. 1A shows in detail a light unit 10 in a passenger service unit 100 which is arranged in a overhead panel 2000 above a passenger seat 300. The light unit is combined with two sensor units 20 and 30 for getting at least the continuous adaptable laser projection 40 shown schematically, wherein the automatically adjustment of the laser projection is integrated in the light unit. The control connection of the light unit is indicated by dashed control line connections 10-50-60 to the control adjustment unit 200 and the sensor units sensing signal connected to the sensor assembly 70 of the control adjustment unit as indicated by a dashed sensing signal line connection 20-30 in FIG. 1A.

The light projection 40 is provided by the beam forming module 50, the light forming module 60 and the sensor assembly 70 regenerated with the light unit 10, after detecting of the first sensor unit 20.

Further the lighting device 1000 includes an operator system 300 as shown in FIG. 1A and a central system 3000 is added, each of the systems are adapted to control and support the light projection.

In detail the light unit 10 of the present embodiment has a light source 2, a beam forming element 5, a light forming element 6, a filter 3 and an apparatus frame 8 which are control connected to the beam forming module 50 and the light forming module 60 of the control adjustment unit 200. Further the light unit has other symbolically shown light forming elements 7 which are also control connected to the control adjustment unit 200.

The light forming module 60 is adapted to the light source. The light forming module further comprises white light module 61 and color light modules 62. An arrangement for actuation may comprise electric motors or other drive devices for actuating the filter 3 and/or an arrangement of control of the light source 2 may comprises a current control or the like.

The beam forming module 50 is separated in a beam focus module 51, in a beam width module 52 and a beam direction module 53. These modules are control connected with the light unit, as well the associated elements.

The sensor assembly 70 of the control adjustment 200 unit in this embodiment has an infrared sensor module 71 and a stray light module 72. The infrared sensor module and the stray light sensor module are sensing signal connected to a infra-red sensor 31 and a stray light sensor 31, for instance a photodiode or the like, respectively. The providing of an continuous adaptable operator surface and the detecting of incoming signals will be done with the aforementioned combination of the first and second sensor unit, sensor assembly 70 and operator system 300.

In the present embodiment the lighting device 1000 can be controlled by an operator system or by an external unit 3000. The light projection itself will be regulated on one hand by the passenger's incoming signals and on the other hand by the sensor units, naturally controlled by the control connected sensor assembly and the operator system 300, optionally by an external unit 3000. Thus, the passengers 510 is able to adapt the to his convenience the operator surface on each suitable body he would like to use for the operating surface, for example a touch pad 41.3 on the passenger's hand 511. The touch pad is stored as an operator surface in the operator system, which might be also an illumination pattern or holographic virtual key board. In this FIG. 1A a touch pad is visualized on the passengers hand as an operator surface for generating touch signals.

The passengers hand is not defined in its position or size and as shown in FIG. 1A can be placed at any position of the seating area of the passenger symbolized with the passenger's seat. The first sensor unit will be able to sense the size and the position of each suitable body. By signaling via the sensing signal connection the sensor assembly will be triggered to actuate via the beam forming and the light forming module such that the light unit will provide the continuously requested laser projection of an operating surface.

Also, by the way of providing an operator surface the second sensor unit will detect the incoming touch signals corresponding to the position on the operation surface being touched. The second sensor unit will be able to detect the incoming signal as a incoming motion and also detected the position on the continuous adaptable provided surface. By signaling via the sensing signal connection the sensor assembly provides the touch signals to the operator system and this system will generate the determined operator response.

For identical or equivalent items or items of identical or equivalent function in the following the same reference marks are used. For corresponding features thus it is referred to the above description.

Figure 1B:
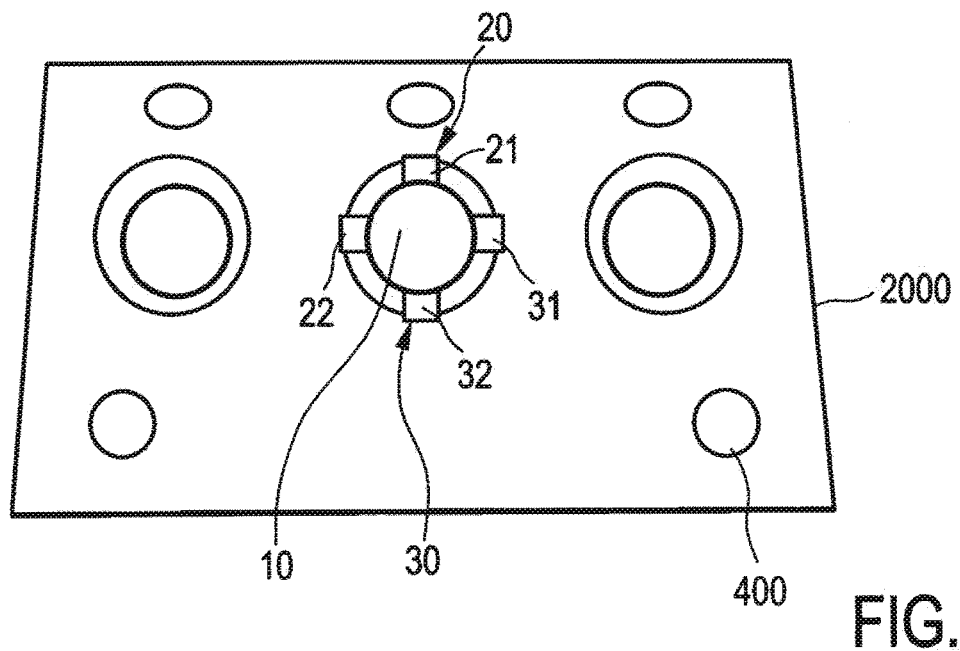
FIG. 1B: a picture of an embodiment of a reading light according to the system of FIG. 1 for exemplifying a lighting device integrated in the overhead panel of a cabin with and/or in combination with a reading light.

FIG. 1B shows a realization of a continuous adaptable light projection as described in FIG. 1A. The light unit 10 in the present embodiment is integrated in the overhead panel 2000 having an attend call button 400. The light unit is additionally combined with integrated sensor unit 20 for providing size and position information and for detecting generated touch signals. The sensor unit 20 with the infrared sensor 21 and the stray light sensor 22 and the second sensor unit 30 with the infrared sensor 31 and the stray light sensor 32 are perimetrically arranged to the light unit; the light unit can have the form of a reading light.

Figure 2A:
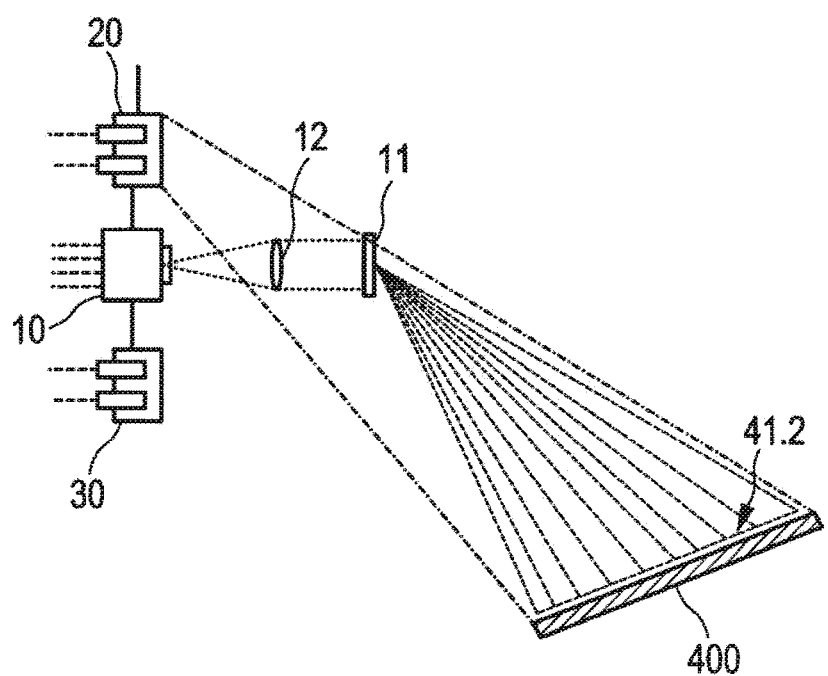
FIG. 2A: a simplified scheme of a further embodiment of a lighting device for light projection on a suitable body.

FIG. 2A shows a simplified pictorial and side view illustration as a particular embodiment for providing an illumination pattern employing in this case a diffractive optical element 11 (as an other symbolically light forming element 7 shown in FIG. 1A) having diffraction orders selected to provide a pattern configuration which have a relatively low maximum diffraction angle. The required size and position of the illumination pattern 41.2 was and will be continuously detected by the first sensor unit 20 and adapted with the light unit 10 as aforementioned described in FIG. 1A.

Figure 2B:
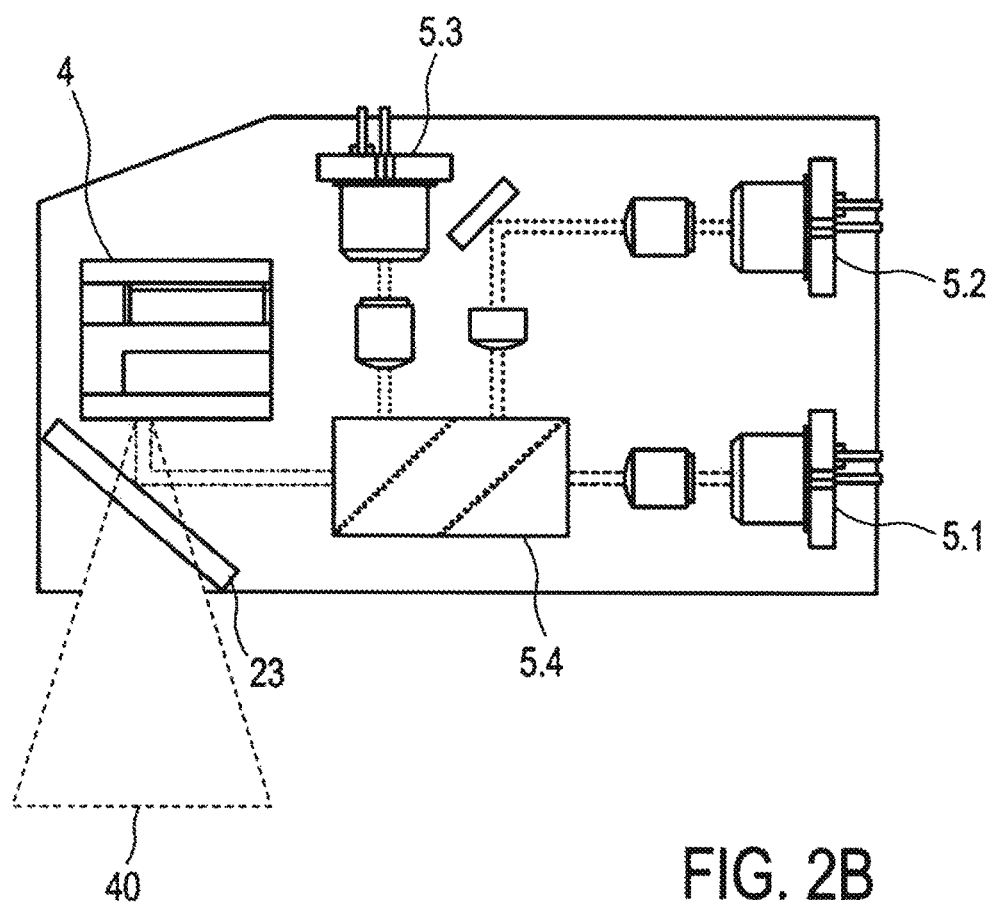
FIG. 2B: a simplified scheme of still a further embodiment of a lighting device for adaptation of a light projection.

FIG. 2B shows a simplified scheme of an additional embodiment of an adaption of light projection. In FIG. 2B the beam forming unit 5 is illustrated in detail with the red laser 5.1, the green laser 5.2 and the blue laser 5.3; the laser beams are split, respectively collected, in a beam splitter 5.4. The resulting laser beam is combined with a MEMS mirror/scanner 4 for a dynamic light modulation and a reflection sensor 23. The assembly of FIG. 2B provides the continuously adaptable light projection 40 based on a laser light for illumination of an exactly required area.

Figure 3:
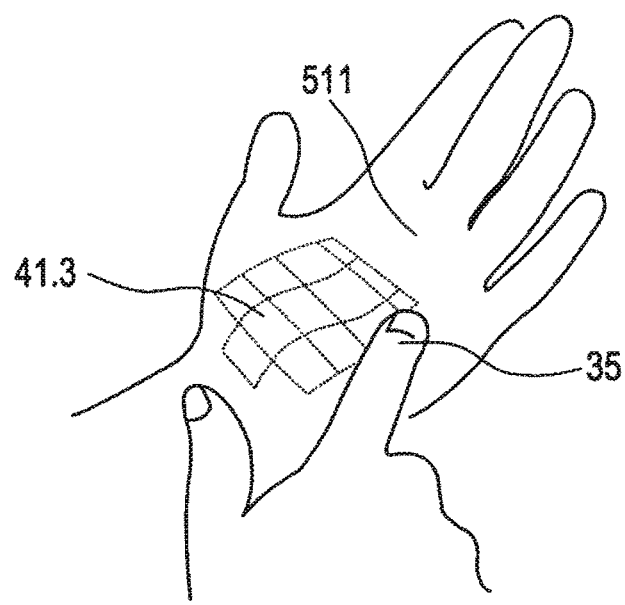
FIG. 3: an embodiment of a light projection in form of a virtual touch pad provided on the passengers hand and the included generating of a touch signal.

FIG. 3 shows the implementation of the described light projection of FIG. 1, in this case the operator surface 41.3 is in form of a touch pad on the suitable body; here the inside area of the passenger' hand 511 and the incoming touch signal 35.

Figure 4:
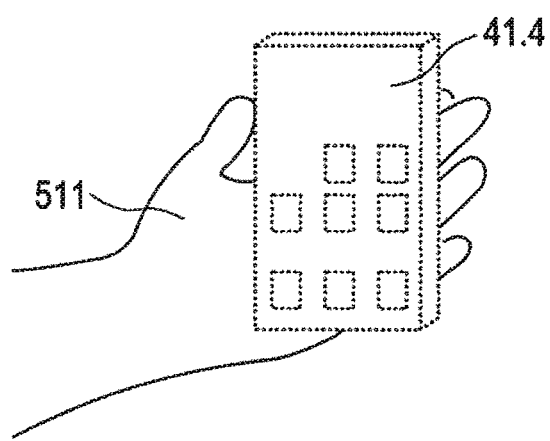
FIG. 4: a further embodiment of a light projection in a schematic view of a virtual holographic film laser projection of a remote control device in a passengers hand.

As shown in FIG. 4 a holographic film 41.4 for an operator plane is also possible. The handling of a 3-D virtual touch pad in a passenger's hand 511 is much more convenient and useful and would offer the possibility to replace a physical remote control by a virtual remote control.

Figure 5:
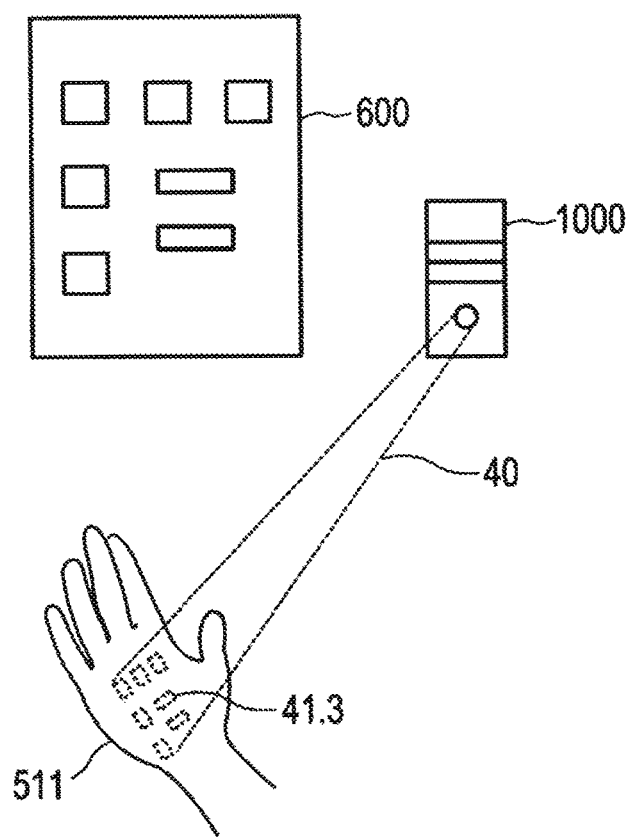
FIG. 5: a schematic view of the embodiment of FIG. 3 and FIG. 4 with a physical touch pad adjoining a virtual touch pad on the passengers hand.

In FIG. 5 the particular embodiment shows the virtual touch pad 41.3 provided by a laser projection 40 of an lighten device 1000 on a passenger's hand 511, flexible in size and position wherein the virtual touch panel 41.3 adjoin a physical touch panel 600 which interacts with the virtual touch panel. In this case the lighting device 1000 is combined with the physical touch panel and placed nearby to the touch panel. This offers as a new feature in a passengers cabin a simply implementation for the continuous adaptable laser projection which increased the flexibility of a permanent installed physical touch panel.

Figure 6:
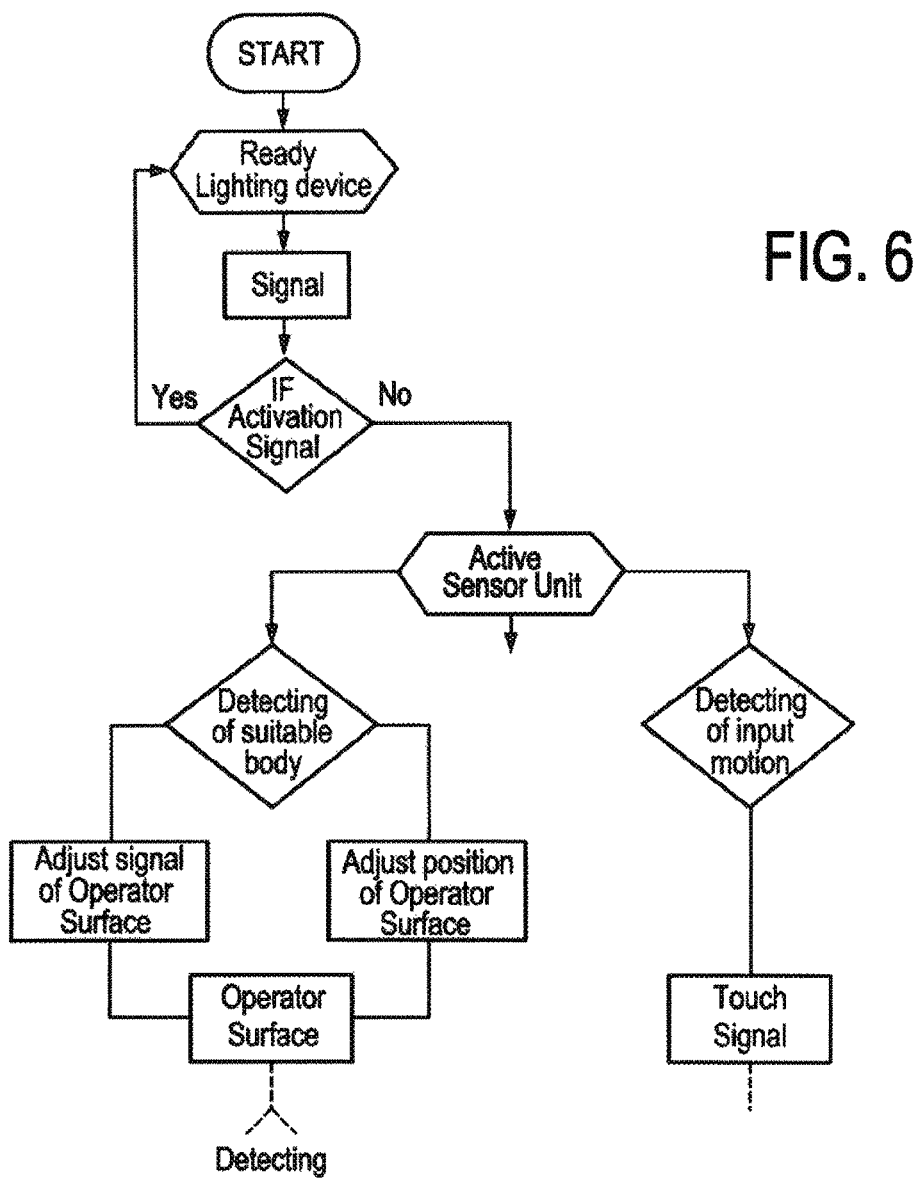
FIG. 6: a simplified flow chart of an embodiment of a method for illustrating an operation of light projection combined by activating with an activation motion.

FIG. 6 shows a simplified extraction of a flow chart illustrating wherein the operating of light projection as described in FIG. 1 is compliment by activating the lighting device with an activation motion. After the service of a passenger server unit is activated, the ready lighting device is applied to the passenger service unit. After getting an incoming signal, which can be for instance an activation motion like a whipping gesture, a touch to a certain point, but also an acoustic signal, a certain button and so on, the control unit will analyze the signal. If this signal is recognized as the activation motion or starter signal the active sensor units will be provided. The first sensor unit will detects the suitable body for providing adjusted operator surface in size and position. This adjustment is continuous and while changing position and size of the suitable body for instance a passenger's hand the lighting device will the provided a continuously changed operator surface. Parallel the second sensor unit will detect generated touch signals on the provided surface.

Figure 7:
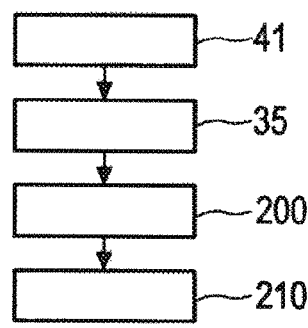
FIG. 7: a simplified flow chart of a further embodiment of a method for exemplifying a sequence of method steps.

FIG. 7 shows a simplified flow chart for exemplifying a sequence of method wherein first an continuous adaptable operator surface 41 on a suitable body is provided by a light projection, after providing the operator surface by detecting size and position by the first sensor unit, the touch signals 35 will be generated, which will be transmitted to a control unit 200 and generate a operator response 210. This can be for instance a virtual pad for using the entertainment surface. By providing the continuous adaptable light projection the passengers can be placed in a sleeping position and generated with the virtual touch pad on his hand the signal for playing one of the declared films.

The invention claimed is:

1. A lighting device for at least one passenger of an aircraft, comprising:

means for providing a light projection of an operator surface on a user-defined suitable body within an aircraft, wherein:
the operator surface is adapted for generating touch signals; and
the operator surface is performed by;
a beam forming module for adjusting the light beam geometrical properties and
a light forming module for adjusting the light optical properties;
wherein:
the light projection is formed as a continuous adaptable light projection, wherein:
a first sensor unit provides size and position information of the suitable body for a continuous adaption of the operator surface on the body;
a second sensor unit detects the generated touch signals corresponding to the position on the operator surface being touched; and
the generated information and the generated touch signals are transmitted to an operator system for achieving an operating response.

2. The lighting device according to claim 1, wherein the continuous adaptable light projection is initiated by an activation signal and/or a starter signal.

3. The lighting device according to claim 1, wherein the operator surface comprises a continuous adaptable illumination pattern.

4. The lighting device according to claim 1, wherein the operator surface comprises a virtual touch panel.

5. The lighting device according to claim 1, wherein the continuous adaptable light projection is formed as a projection of a holographic film.

6. The lighting device according to claim 1, wherein the suitable body is formed by a passenger's hand.

7. The lighting device according to claim 1, wherein the continuous adaptable light projection includes the operating of service unit devices and/or a cabin attended call.

8. The lighting device according to claim 1, wherein a physical touch panel adjoins the virtual touch panel and is configured to generate a touch signal corresponding to the position being touched on the virtual touch panel.

9. A system of a lighting device according to claim 1 and an external unit wherein the operator system is remotely controllable by the external unit.

10. The system according to claim 9 wherein the operator system is adapted to communicate wirelessly with the external unit wherein a transmission technology between the operator system and the external unit is selected from the group of technologies consisting of Wifi, RFID, IR and Bluetooth technology.

11. A passenger service unit comprising a lighting device according to claim 1.

12. A method of operating a lighting device, the method comprising the steps of:
providing a light projection of an operator surface on a suitable user-defined body within an aircraft, wherein the operator surface is adapted for generating touch signals;
performing the operator surface by a beam forming module for adjusting the light beam geometrical properties and by a light forming module for adjusting the light optical properties; wherein:
the light projection is formed as a continuous adaptable light projection, wherein
a first sensor unit provides size and position information of the suitable body for a continuous adaption of the operator surface on the body;
a second sensor unit detects the generated touch signals corresponding to the position on the operator surface being touched; and wherein
the generated information and the generated touch signals are transmitted to an operator system for achieving an operating response.

13. A software code means storable in an operator system and adapted to control operation of a lighting device in the operator system according to a method as claimed in claim 12.

* * * * *